United States Patent [19]

Rosen

[11] Patent Number: 4,872,015

[45] Date of Patent: Oct. 3, 1989

[54] SATELLITE COMMUNICATIONS SYSTEM FOR MOBILE USERS

[75] Inventor: Harold A. Rosen, Santa Monica, Calif.

[73] Assignee: Hughes Aircraft Company, Los Angeles, Calif.

[21] Appl. No.: 936,301

[22] Filed: Dec. 1, 1986

[51] Int. Cl.[4] ............................................. H04B 7/185
[52] U.S. Cl. ..................................... 342/353; 455/13
[58] Field of Search ............... 342/353, 356, 375, 457, 342/352, 354; 455/12, 13

[56] References Cited

U.S. PATENT DOCUMENTS

| | | |
|---|---|---|
| 3,810,255 | 5/1974 | Wachs et al. |
| 4,002,980 | 1/1977 | Herz . |
| 4,532,635 | 7/1985 | Mangulis ............................... 455/13 |
| 4,628,506 | 12/1986 | Sperlich ................................ 455/12 |
| 4,689,625 | 8/1987 | Barmat ................................. 342/356 |

FOREIGN PATENT DOCUMENTS 2347836  11/1977  France .

OTHER PUBLICATIONS

IEEE 1983 National Telesystems Conference, Kiesling, pp. 315-320.
International Conference on Communications, 1971, IEEE, McGregor et al., pp. 42-7 to 42-14.
Globecom 85, IEEE Global Telecommunications Conference, Dec. 1985, vol. 3, Kriedte et al., pp. 3811-3816.
The Radio and Electronic Engineer, vol. 37, No. 2, Feb. 1969, Shaw, pp. 117-129.

Primary Examiner—Theodore M. Blum
Attorney, Agent, or Firm—S. M. Mitchell; W. K. Denson-Low

[57] ABSTRACT

A satellite communication system is disclosed that would allow for communication between mobile and fixed terminals. The communications system includes a plurality of mobile users, a satellite in geosynchronous orbit for providing frequency addressable uplink and downlink signals to the mobile terminals, a base station for receiving siganls from and transmitting signals to the satellite and a plurality of fixed users coupled to the base station. The system provides the advantage of frequency reusability and frequency addressability in the uplink and downlink transmissions of the mobile users.

25 Claims, 8 Drawing Sheets

SATELLITE COMMUNICATIONS SYSTEM FOR MOBILE USERS

1. Field of the Invention

This invention relates to a satellite communications system for mobile users, more particularly to a satellite communications system that provide services to land, air or sea mobile stations.

BACKGROUND OF THE INVENTION

Geostationary satellites are presently utilized extensively for providing voice and data communication services to maritime mobile stations. It is presently contemplated that satellite systems will also be used to provide communication to mobile users on the land or in the air.

Present systems employ primarily earth coverage beams to provide for the communication between a mobile station and a fixed station. Accordingly, in the earth coverage beam systems, the ocean or other large bodies of water are covered by a beam from the antenna of the satellite which allow for each of the mobile stations i.e., boats, to pick up a certain frequency and communicate to fixed users. However, for the land or air mobile stations what is needed is a satellite communications system which will have more directional beams to provide both higher gain and frequency reusability.

This invention relates in general to satellite communication system employing frequency addressable signals, and in particular to satellite communication systems and beam forming networks therefor for providing high-gain frequency addressable beams to communicate with mobile users.

In communication satellite systems which interconnect large numbers of low gain terminals, the most important parameters effecting the system capacity are the effective isotropic radiated power (EIRP) of the satellite and the available bandwidth. EIRP refers to a measure of the satellites transmitter power which takes into consideration the gain of the antenna. EIRP is the power of a transmitter and an isotropic antenna that would achieve the same result as the transmitter and the antenna which is actually employed.

In the past, high antenna gain and multiple frequency reuse have been achieved by employing a plurality of uplink and downlink beams covering the regions of the country or other area of the earth to be served. Both frequency division and time division systems have been used or proposed to interconnect large numbers of signals from many geographically separated earth stations. Time division systems permit the satellite transmitters to operate efficiently. This advantage is realized because only one time division signal at a time is amplified in a transmitter, so that it may be operated at or close to single channel saturation, the most efficient operating point.

However, time division systems require high power ground transmitters and expensive signal processing and are therefore incompatible with low cost earth stations. Frequency division systems are better suited to low cost earth stations, but have lower satellite transmitter efficiency because each transmitter handles multiple carriers. Since multiple carrier amplifiers generate undesirable intermodulation products that increase in power as the transmitter efficiency is increased, the optimum compromise between transmitter efficiency and intermodulation generation results in a relatively low transmitter efficiency.

The available bandwidth of a satellite system is determined by the number of times the allocated frequency spectrum can be reused. Polarization and spatial isolation of beams have been employed to permit reuse of the frequency spectrum. As the number of isolated beams is increased, however, the problem of interconnecting all the users becomes very complicated and one of the factors that limit the number of reuses of the frequency spectrum.

For the various users of satellite communication systems, there are different frequency ranges that are applied thereto. Accordingly, the frequency spectrum allocated for satellite communication to and from mobile users has typically been in the L band frequency range approximately (1.6 GHz) frequency, with the forward and return link bands being separated by approximately 100 MHz.

The satellite-to-base station links have been in the C band from (approximately 6/4 GHz) for the maritime mobile service, while the use of the Ku band allocations (approximately 14/12 GHz) has been suggested for land mobile service, and the links for aeronautical mobile systems will probably be in one or the other of these bands. The typical satellite system would have a number of mobile users in a particular zone that could communicate with fixed parties.

The difficult link in a system such as that above described, is between the satellite and the mobile user, since the mobile antenna is restricted in size and gain relative to the fixed service antennas. Most of the satellite resources such as payload power, volume, and weight are therefore dedicated to this link.

A frequency reusable and frequency addressable satellite communication system for use in the Ku band frequency range is described in U.S. patent application Ser. No. 896,983 entitled, "Satellite Communication System Employing Frequency Reuse", filed in the name of Harold A. Rosen and assigned to the assignee of this application. This above-identified patent application describes a satellite communication system for interconnecting large numbers of earth terminals which maximized satellite EIRP, as well as the available bandwidth.

The system employs highly directional beams on the downlink which substantially increases the EIRP and allows multiple reuse of the assigned frequency spectrum. As a result, the number of communication channels that can be provided for point-to-point service is maximized. High multi-carrier transmitter efficiency is achieved utilizing this system as a result of the dispersion of intermodulation products, and the deleterious affects of rain on the downlink channel are easily overcome by the use of pooled transmitter power. The interconnection of many of the users is achieved by a combination of a filter interconnection matrix within the satellite and a highly addressable downlink beam.

Although this system works very effectively in connection with the described Ku band communication system, it has some disadvantages when utilized for communication systems that include mobile terminals. Firstly, by providing the filter inconnection matrix within the satellite, there is increased complexity therein that adds to the expense and weight to the satellite. In addition, although the downlink beams of the above-described system are frequency addressable, the uplink beams are frequency independent. This is required for the above-mentioned system because it is important to provide for the most direct route from one location via satellite to another location.

However, the frequency independence of the uplink beams creates zones of overlap within different geographic regions that reduces the communications system's capacity. Thus, although this system is very useful for communications systems that provide direct communication between fixed terminals, it is not as effective when mobile terminals are present in the communications system.

Accordingly, what is needed is a satellite communications system for mobile users that provides an effective communication link between a mobile user and a fixed user. The system should also utilize the frequency bandwidth in the most efficient manner so as to allow for the maximum number of transmissions. The system should finally make efficient use of satellite resources in terms of payload power, volume and weight.

SUMMARY OF THE INVENTION

A satellite communications system between mobile terminals and fixed terminals is disclosed. The communications system comprises a plurality of mobile users, a satellite in geosynchronous orbit for receiving signals from and transmitting signals to the mobile user, a base station for receiving from and transmitting signals to the satellite, and a plurality of fixed users coupled to the base station. In an embodiment of this invention, the uplink transmissions from the mobile user to the satellite is received by the same antenna reflector and subsystem utilized in the downlink transmissions.

Frequency addressable beams are used on both the forward and return links to the mobile users. In this implementation, these beams are fan beams whose east-west directions are determined by the frequency of the signals employed. This permits the high gain beams to cover wide areas. The area to be covered is divided into zones in which the allocated frequency spectrum is reused, providing more usable spectrum and hence channel capacity.

Also provided in this system is a communication subsystem that includes an improved beam forming network that utilizes an alternating coupler, time delay arrangement for providing a more weight efficient and frequency efficient subsystem.

Accordingly, this arrangement provides for a satellite communication system that can be utilized with mobile users. This improved system also provides the advantages of frequency reusability and frequency addressability in the uplink and downlink transmissions of the mobile users.

DETAILED DESCRIPTION OF THE INVENTION

The present invention comprises a novel communications system between fixed and mobile terminals. The following description is presented to enable any person skilled in the art to make the invention and is provided in the context of a particular application and its requirements. Various modifications to this embodiment will be readily apparent to those skilled in the art, and the generic principles defined therein may be applied to other embodiments and applications without departing from the spirit and scope of the invention Thus, the present invention is not intended to be limited to the embodiments shown, but is to be accorded the widest scope consistent with the principles and features disclosed therein.

Figure 1:
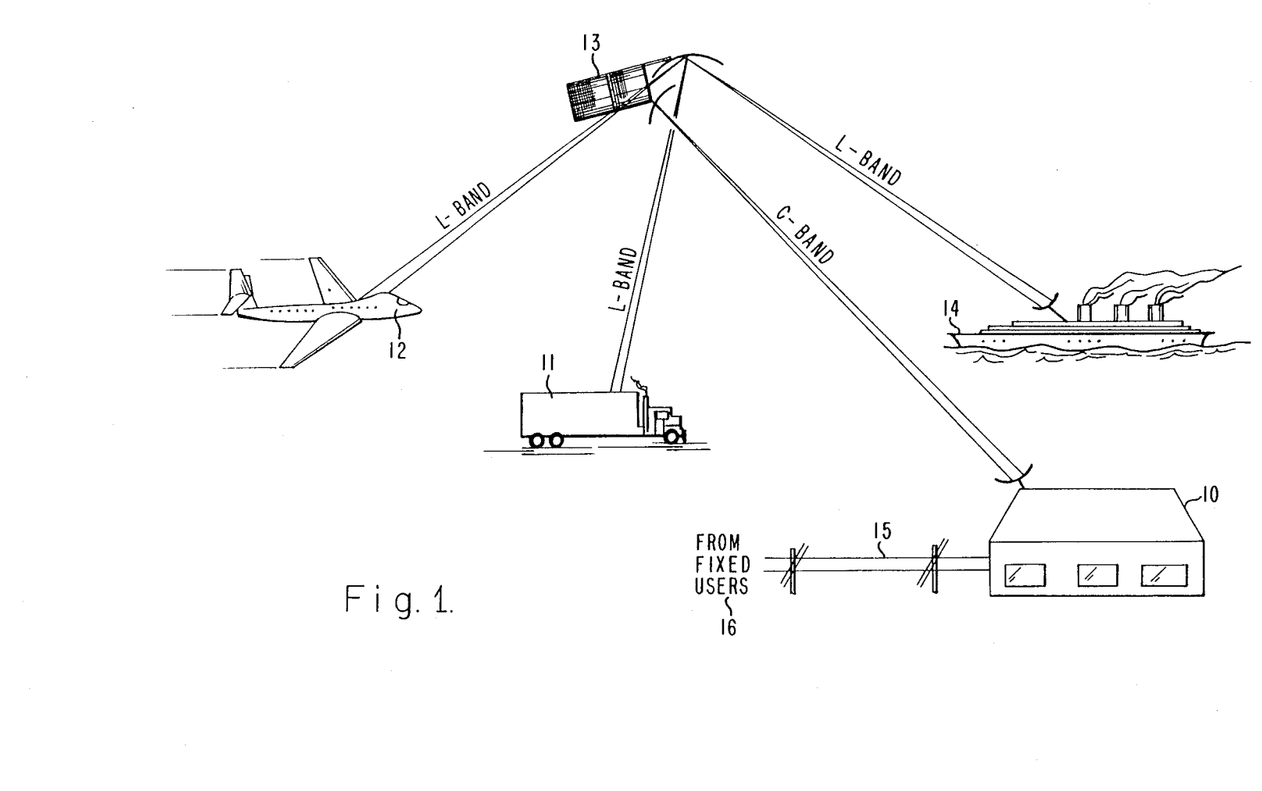
FIG. 1 is a pictorial view of the mobile satellite system of the present invention.

FIG. 1 shows a mobile satellite communications system. As is shown, a base station 10 transmits and receives signals to and from a satellite 13. Satellite 13 can also transmit and receive signals to and from the airplane 12 (air mobile), truck 11 (land mobile) and ship 14 (sea mobile). The base station 10 also transmits and receives signals along land line 15 to and from fixed users 16.

The frequency band allocated for satellite communication to and from the mobile users is typically in the the L-band range with the down and uplink bands being separated by approximately 100 MHz. The satellite-to-base station links are, correspondingly, typically in the Ku band or C band allocations. As before mentioned, the difficult link in mobile satellite service is to the mobile users because the mobile antenna is restricted in size and gain relative to the fixed service antenna.

Figure 2:
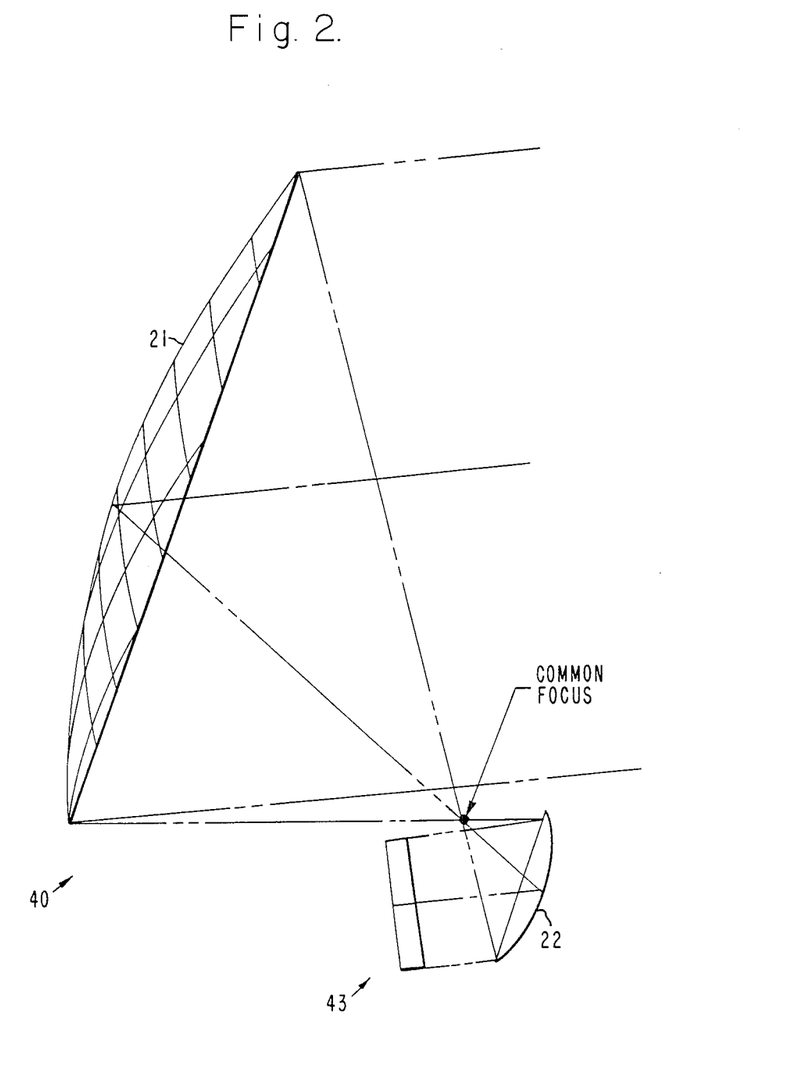
FIG. 2 is a view of an imaging reflector arrangement for forming an addressable beam utilizing a small array on a satellite.

Accordingly, most of the satellite resources in payload power, volume and weight are concentrated in the antenna subsystem and the L-band transmitter. An effective satellite antenna subsystem 40 for the satellite is shown in FIG. 2. The subsystem includes an image reflector arrangement 40 that comprises a large reflector 21, small reflector 22 and feed array 3. The feed array 23 as shown, provides signals to the small reflector 20 that are in turn transmitted to the large reflector 21. Accordingly, the signals from the feed array 23 are reflected by the small reflector to the large reflector 21 of the satellite 13 (FIG. 1) to the various users.

Figure 3:
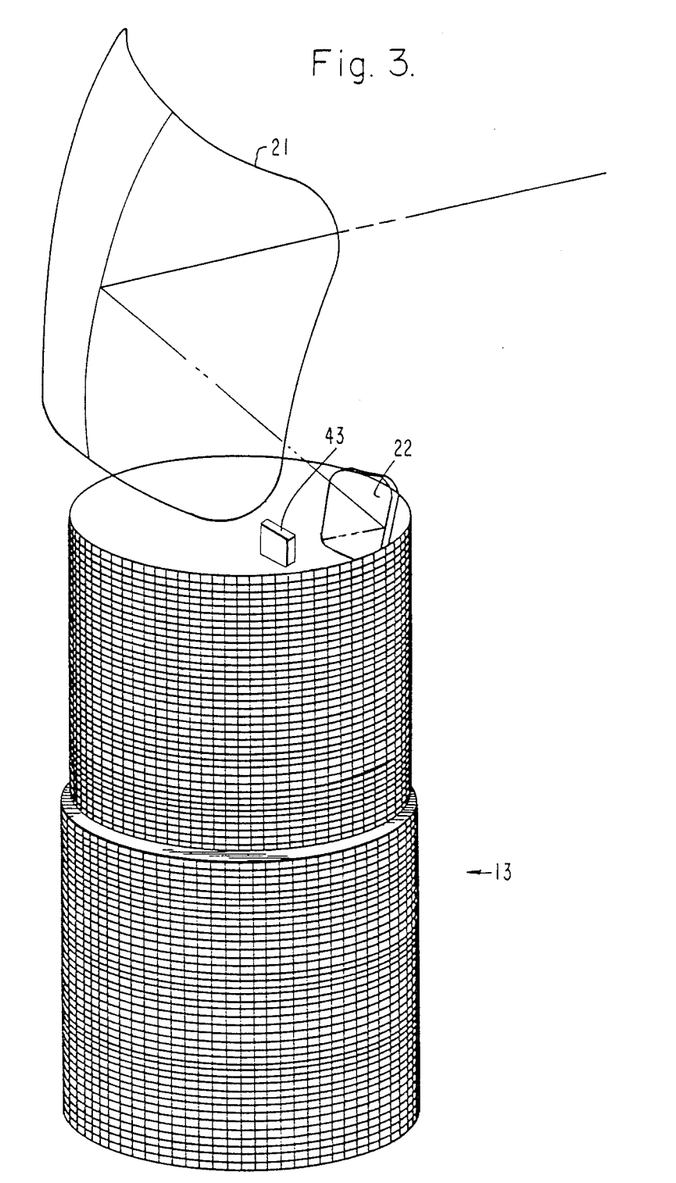
FIG. 3 is a pictorial view of a satellite with the imaging reflector arrangement of FIG. 2 installed thereon.

FIG. 3 shows in pictorial view a typical satellite 13 with the corresponding feed array 42 and large and small reflectors 21 and 22.

The communications system by use of a main base station 10 (FIG. 1) and improved features of the antenna subsystem 40 of the satellite 13 has several advantages over similar systems designed for the fixed service. With this combination of features, the uplink and downlink beams from the mobile users are received by the same antenna reflector and feed array system 40 on the satellite 13. Accordingly, in this system, all beams to the mobile users on the uplink as well as downlink beams are frequency addressable.

Figure 4:
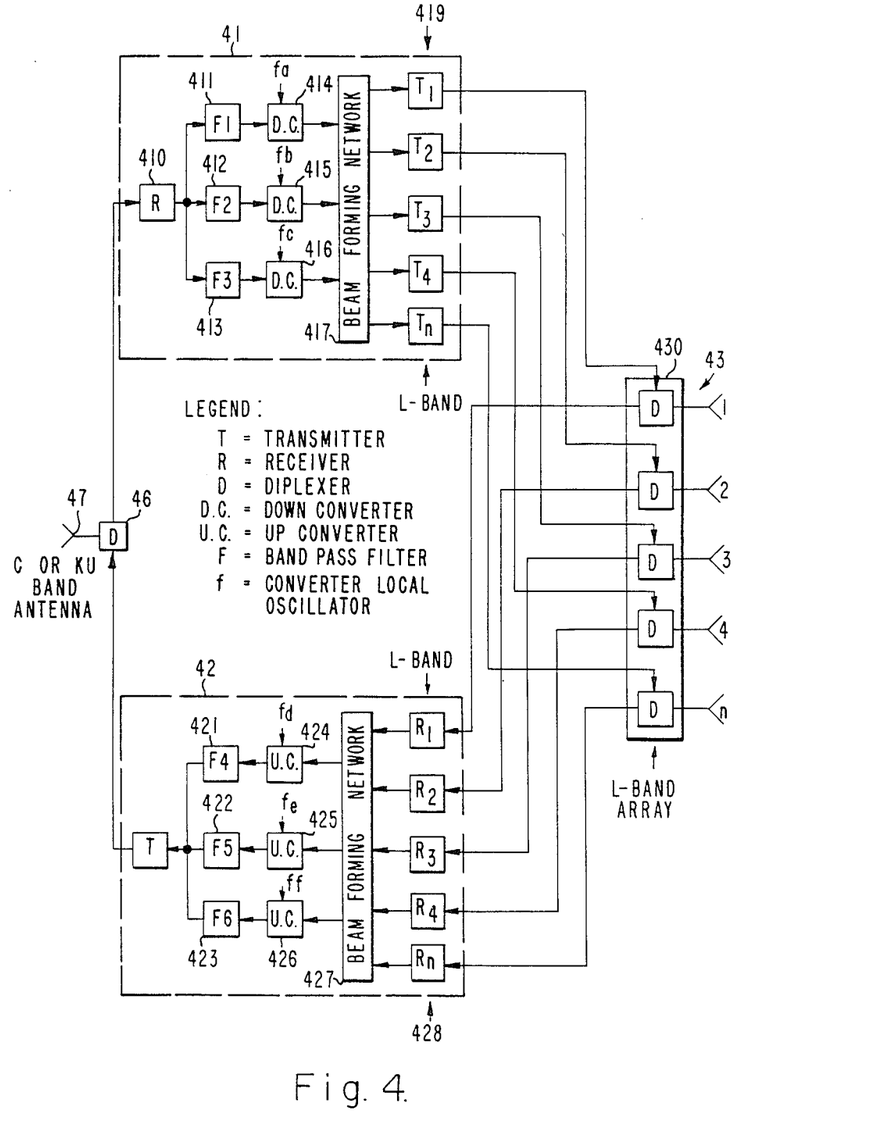
FIG. 4 is a block diagram of the communication subsystem.

A block diagram of a communications subsystem 50 within satellite 13 is disclosed in FIG. 4. For the purposes of illustration, it will be assumed that the signal received by or transmitted by antenna 47 are in the Ku frequency band and that the frequency range of the signals received by or transmitted from the antenna array 43 is in the L-band frequency range. It is well recognized by one ordinarily skilled in the art that other frequency bands could be utilized, if allocated, without departing from the spirit and scope of the invention.

As is shown in FIG. 4, the subsystem 50 includes a diplexer 46, which is connected to the receive section 41 and the transmit section 42 of the subsystem 50. The receive and transmit sections 41 and 42 are in turn connected to the L-band array 43 via diplexers 430.

The receive section 41 further comprises, a receiver 410 which in turn provides signals to bandpass filters 411-413. Filters 411-413 are connected to down-converters 414-416 respectively. Each of the down-converters 414-416 are connected to beam forming network 417. Beam forming network 417 in turn provides signals to transmitters 419. Transmitters 419 in turn provide appropriate signals to the diplexers 430 coupled to the L-band array 43.

The transmit section 42 is the mirror image of the receive section 41 in that it operates in a manner similar to the receive section 41, the only difference being that the signals are reversed. Accordingly, signals from the mobile users are provided to L-band receivers 428 which in turn provide signals to beam forming network 427. Beam forming network 427 in turn sends signals to up-converters 424-426. Each of the up-converters 424-426 provide signals to bandpass filters 421-423 respectively. The signals from filters 421-423 are sent to the Ku band transmitter 420 and thereafter provided to diplexer 46. The diplexer 46 provides the signal along the antenna 47 to base station 10 of FIG. 1.

The subsystem 50 receives signals from and transmits signals to the base station 13 as well as transmitting signals to and receiving signals from the mobile users. In the forward link, signals, typically in the frequency division multiplex mode, are received by subsystem 50 from the base station 10 by diplexer 46 via antenna 47.

The received signals are then amplified at receiver 410. The signals are then separated by the bandpass filters 411-413 into a number of bands that are equal to number of zones into which the area to be served has been divided. For the purpose of illustration, three bandpass filters and thus three zones are described, but one ordinarily skilled in the art will recognize that there could be a greater or lesser number of filters dependent upon the particular application.

The signals from the bandpass filters 411-413 are then presented to down-converters 414-416 which translates these band signals from separate Ku band frequency bands to a single L-band frequency band. Provided to each of the down converters 414-146 are local oscillator frequencies fa-fc respectively which are chosen to provide this translation.

Thereafter, these signals are presented to inputs of the transmit beam forming network 417. Each of the inputs to the network 417 correspond to one of the three zones of geographic region to be served. The beam forming network 417, as will be described in more detail hereinafter provides signals to the transmitters 402. The transmitters 402, in turn drive the array columns 43 via diplexers 430 to form narrow transmit beams in the direction of the desired mobile users, the direction being determined by the frequencies of the transmit signal.

In the return link, the uplink signals from mobile users reaching the feed array columns 43 are directed via the diplexers 430 to the receivers 428 to the receive beam forming network 427 which is similar in operation to the transmit network 417. The beam forming network 427 provides signals corresponding to the three zones to up-converters 424-426.

Also, similar to the down-converters 414-416 of the receive section, the up-converters 424-426 each have a different local oscillator signal fd-ff presented to them so that these bands of signals, which reuse the same frequency spectrum at L-band in the three zones, may be transmitted to the base station in three frequency separated bands. The bands are then combined in the output multiplexer comprising bandpass filters 421-423 and then amplified in the Ku band transmitter for transmission to the base station 10.

Figure 5:
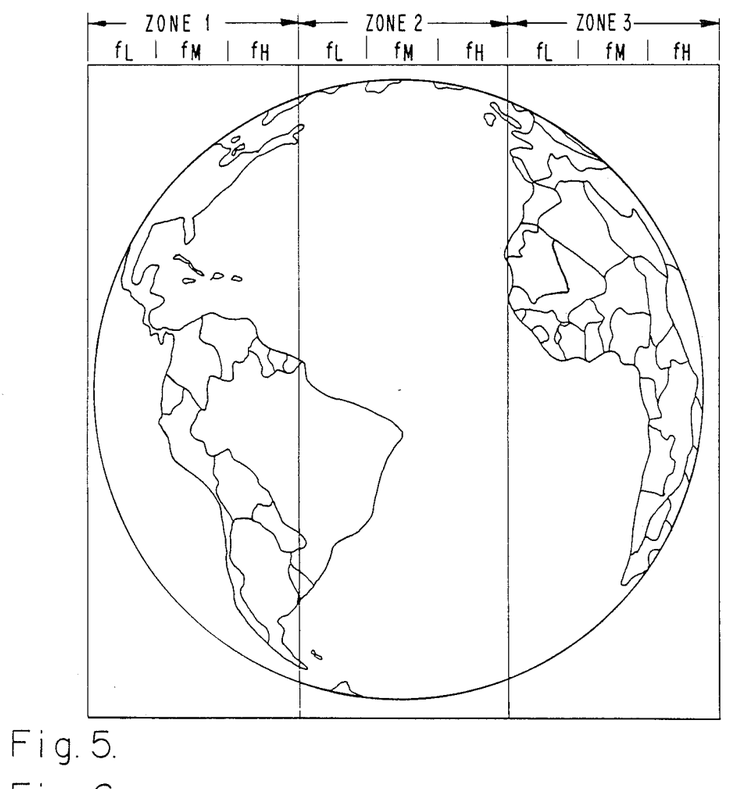
FIG. 5 is a pictorial view of the division of the geographical regions to be served by the mobile satellite system for an Atlantic Maritime Mobile System.
Figure 6:
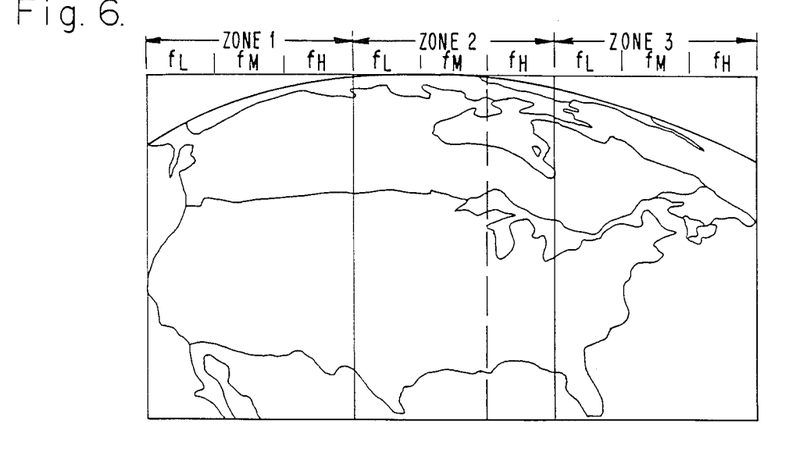
FIG. 6 is a pictorial diagram of the division of the geographical region to be served by a mobile satellite system for a land mobile system serving the United States and Canada.

FIGS. 5 and 6 depict a beam coverage of the mobile satellite system for two different geographic areas. FIG. 5 depicts the geographical region to be served by the mobile satellite system for an Atlantic maritime mobile system. FIG. 6 depicts the division of the United States and Canada to be served by a land mobile system. Shown in each case are the areas within the zones into which the signals in the lower, middle and higher thirds of the allocated L-band frequency spectrum designated fl, fm and fh are directed. These areas apply to the uplink as well as the downlink transmissions.

The base station 10, receives all return signals from the mobile users via the satellite 13 and thereafter connects those mobile users to fixed users preferably by land lines 16 via a telephone exchange network.

Figure 7:
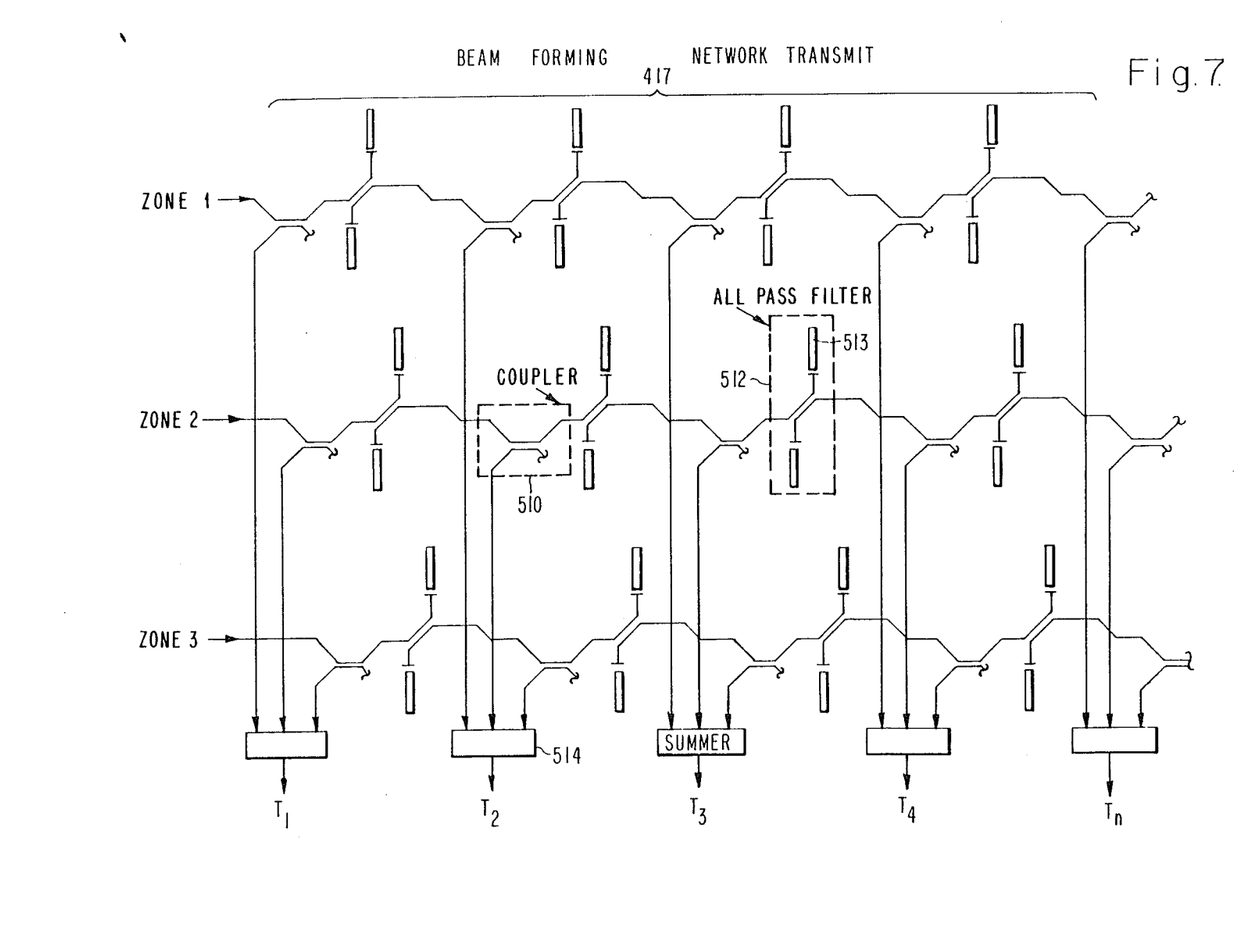
FIG. 7 is a diagram of the transmit beam forming network or FIG. 4.
Figure 8:
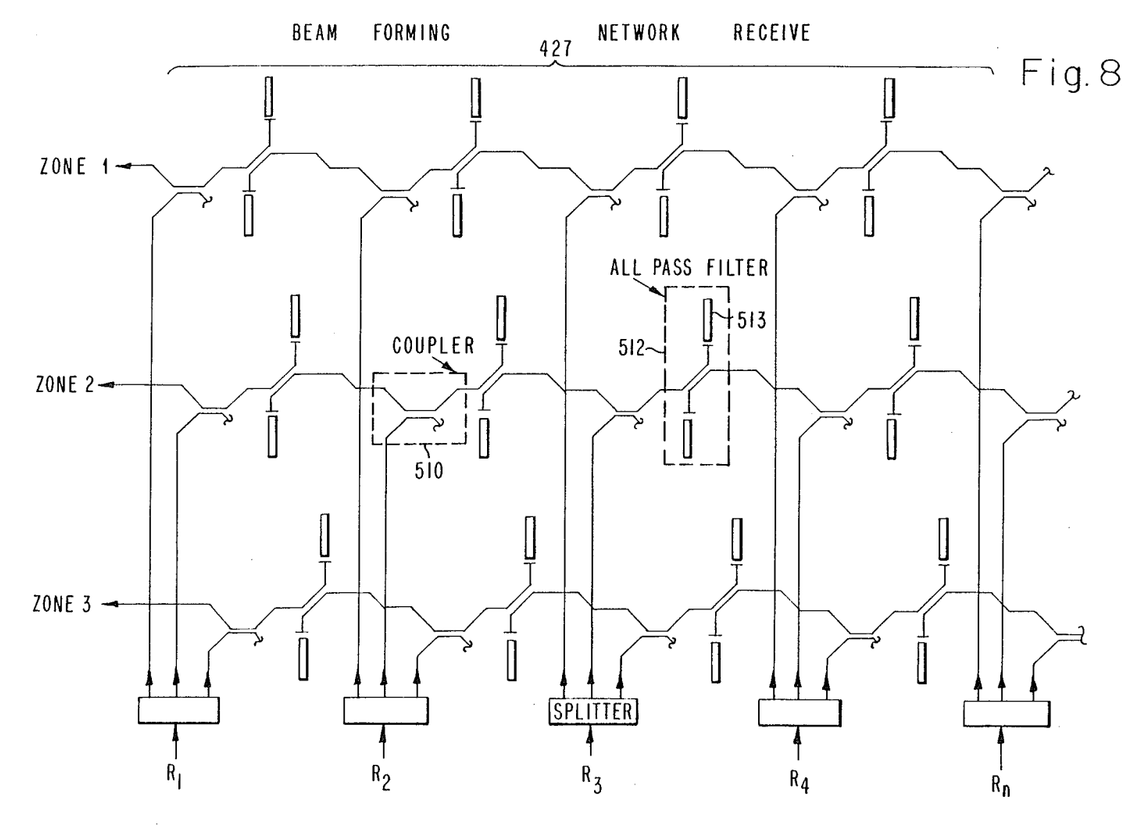
FIG. 8 is a schematic view of the receive beam forming network of FIG. 4.

FIGS. 7 and 8 show in more detail the beam forming networks 417 and 427 of the subsystem 40. Beam forming networks 417 and 427 are similar in operation and construction and operate in a similar manner except that network 417 is operating in the transmit mode and network 427 is operating in the receive mode. The network 417 will be described and it should be assumed that the network 427 operates in a similar manner.

Network 417 comprises a plurality of couplers 510 which are connected in alternating fashion with time delay units 511 in a plurality of zones (1, 2 and 3). The time-delay units 511 are all-pass filters 511 which include resonators 513 in the arms of the unit 512. These time-delay units 511 provide the desired delay in the signals without introducing a frequency dependent loss.

Summers 514 receive signals from each of the zones (1, 2 and 3) via resonators 513 and are arranged to provide outputs that are equal parts of the three zone signals. The outputs of the summers 514 are the inputs to transmitters 402 (FIG. 4). The number of transmitters 419 is dependent on the number of columns in the L-band array 43.

Beam forming networks 417 and 427 can advantageously be produced utilizing square conductor coaxial technology such as that as described in U.S. Pat. No. 4,539,534 entitled, "Square Conductor Coaxial Coupler", and assigned to assignee of this application. Accordingly, by use of these alternating coupler-time delay units in the beam forming networks (417 and 427), a compact, low-loss, beam forming network is provided that is ideally suited to a narrow band application. This type of beam forming network contributes to the low weight and high efficiency of the communications subsystem 50.

Figure 9:
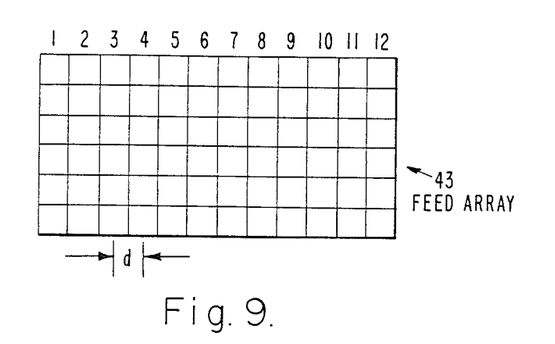
FIG. 9 is a schematic illustration of a feed array system used in the present invention.

FIG. 9, by way of illustration, shows schematically a feed array containing 12 columns of feeds separated by a distance d which would require 12 transmitters. The beam forming networks 417 and 427 direct the antenna beams of the feed array 43 in a direction frequency determined by the signal, the incremental phase shift being related to the time delay between columns as well as signal frequency.

Figure 10:
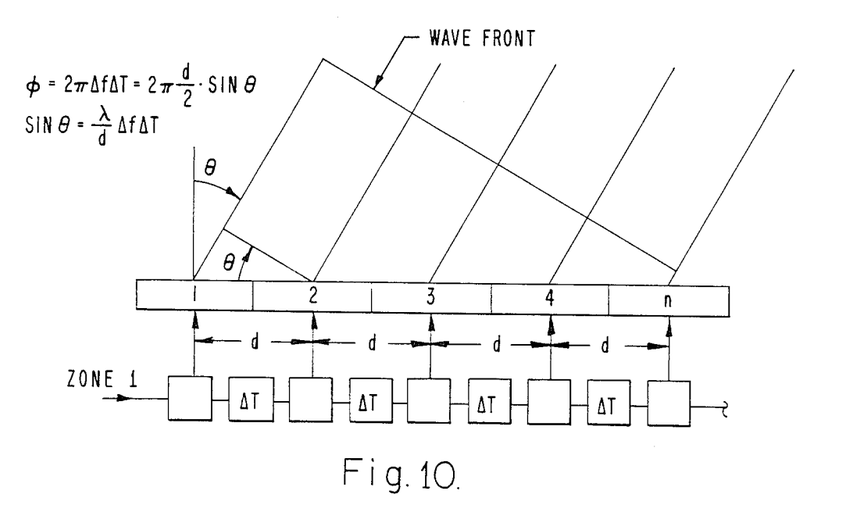
FIG. 10 is a schematic showing the frequency addressability of the beams.

FIG. 10 shows in diagrammatic view columns of array, 43, wherein d is equal to the spacing between the columns of array 43. The resulting antenna beam has an angular offset of $\theta$ where $\theta$ is defined as the beam scan angle. This means that $\theta$ is the beam scan angle from the normal to the transmit array. The incremental phase shift produced by the time delay 512 is $\Delta T$. The relationship between $\Delta T$ and $\theta$ is given by:

$$\Delta\phi = 2\pi\Delta f\Delta T = \frac{2\pi d}{\lambda} \sin\theta$$

where:
$\lambda$ = signal wavelength
$\theta$ = beam scan angle
d = spacing between array elements The relationship of these different factors provide for frequency addressability of the beams and is given by:

$$\sin\theta = \lambda/d\ \Delta f\ \Delta T$$

where the term $\Delta f$ is the frequency relative to that when the scan angle is zero. The signal frequency used for the downlink to each mobile terminal is chosen to direct the beam to the terminal, thereby maximizing its gain and the link performance. The scan angle of the secondary beam radiated toward the mobile terminal is the angle defined above divided by the magnification factor of the confocal reflectors of FIG. 2.

The uplink transmission from the mobile user to the satellite 13 is received by same antenna subsystem 40 as used for the downlink transmissions by means of the diplexers 430. The uplink frequency used by each mobile terminal is determined by its longitude, so that the maximum uplink gain is available from the satellite antenna. These received signals are then transmitted down to the base station as previously described.

In view of the foregoing description, it is seen that the communication system of the present invention provides an improved satellite communication system for mobile users. The present invention provides advantages that as above-described enhance the performance of the satellite system by providing high gain, addressable beams and frequency reuse.

It is understood that the above-described embodiments are illustrative only and that modifications thereof may occur to those skilled in the art. For example, more than one base station could be utilized in this communication system and this use would clearly be within the spirit and scope of Applicant's claimed invention. Accordingly, this invention is not to be regarded as limited to the embodiments disclosed therein, but is to be limited only as defined by the appended claims in which:

What is claimed is:

1. A system for communicating via a satellite comprising:

a plurality of mobile terminals located within at least two geographical zones;

a satellite positioned in view of the geographical zones for receiving signals from and transmitting signals to the plurality of mobile terminals, the satellite including means for transmitting frequency addressable downlink signals to the mobile terminals, and means for receiving frequency addressable uplink signals from the mobile terminals, said transmitting means and said receiving means each including means for forming a plurality of signal carrying beams of electromagnetic radiation between said satellite and said zones, the positions of the respective beams within each of said zones being a function of the frequency of the beams such that the destination addresses of the respective signals within each zone are determined by the respective frequencies of said beams; and a base station for transmitting signals to and receiving signals from the satellite.

2. The system of claim 1 in which the range of frequencies of the signals that is communicated between the satellite and the plurality of terminals is lower than the range of frequencies of the signals that is communicated between the satellite and the base station.

3. The system of claim 2 in which the range of frequencies that are communicated between the satellite and the plurality of terminals is in the L-band frequency range and the range of frequencies that are communicated between the satellite and the base station is in the Ku-band frequency range.

4. The system of claim 2 in which the range of frequencies that are communicated between the satellite and the plurality of terminals is in the L-band frequency range and the range of frequencies that are communicated between the satellite and the base station is in the C-band frequency range.

5. The system of claim 1, further comprising:

an antenna feed array which is common to and forms part of the means for transmitting frequency addressable downlink beams and part of the means for receiving frequency addressable uplink beams.

6. The system of claim 5, further comprising:

a plurality of diplexers connected to the feed array and forming part of the means for transmitting and the means for receiving;

a plurality of transmitters connected to the diplexers for providing amplified downlink signals to the feed array, and forming part of the means for transmitting;

a plurality of receivers connected to the diplexers for receiving uplink signals from the feed array, and forming part of the means for receiving;

a transmit beam forming network forming part of the means for transmitting and having a plurality of input lines connectable to a source of distinct input signals, and plurality of output lines respectively connected to distinct ones of the transmitters; and a receive beam forming network having a plurality of input lines respectively connected to distinct ones of the receivers and a plurality of output lines each associated with a corresponding plurality of frequency converters, the transmit beam forming network and the receive beam forming network each including a plurality of summers, a plurality of couplers and a plurality of means for producing a time-delay to a signal applied thereto.

7. The system of claim 1, further comprising an antenna structure including an array of signal-receiving feed elements, and wherein the means for receiving frequency-addressable, signals includes a network provided with a plurality of input lines respectively connected the feed elements in a predetermined order and a plurality of output lines, the network including a plurality signal-splitting devices connected to the input lines, a plurality of couplers connected to the signal splitters, and a plurality of time-delay units each of which is respectively associated with a distinct one of the couplers, the couplers and time-delay units each being associated with only one of the output lines.

8. The system of claim 7, wherein the network is constructed to enable to the means for receiving to detect beams from a predetermined direction relative to the antenna structure, which direction at least in part depends upon the incremental phase shift provided to signals applied to the input lines by the time-delay units.

9. The system of claim 1, including a plurality of fixed terminals communicatively coupled to the base station, and wherein the base station connects the fixed terminals to the appropriate mobile terminals via the satellite.

10. A satellite communication system comprising:
a satellite positioned in view of a geographic area defined by a plurality of zones, the satellite including means for converting between a first range of frequencies and a second range of frequencies, means for receiving high gain, frequency addressable uplink beams at the second range of frequencies from each of the zones, and means for transmitting downlink beams at the second range of frequencies to each of the zones;
said receiving means and said transmitting means each including means for forming the beams in each of the zones in a manner such that location addresses of the beams for each of said zones are determined by the respective frequencies of the beams so as to maximize the gain of the said beams;
a base station located within the geographic area for transmitting signals to and receiving signals from the satellite at the first range of frequencies;
a plurality of fixed terminals coupled to the base station; and
a plurality of mobile terminals located within the geographic area for receiving signals from and transmitting signals to the satellite at the second range of frequencies.

11. The system of claim 10 in which the first range of frequencies is within the Ku-band frequency range.

12. The system of claim 10 in which the first range of frequencies is within the C-band frequency range.

13. The system of claim 10 in which the second range of frequencies is within the L-band frequency range.

14. The system of claim 10, wherein the means for receiving high gain, frequency-addressable uplink beam includes:
an antenna structure provided with an array of feed elements, and
a beam forming network provided with a plurality of inputs for receiving signals from the feed elements, a plurality of outputs, and means for selectively transferring portions of signals applied to the input lines to the output lines in a manner which depends at least in part upon characteristic frequencies associated with the input signals, whereby the beams detected by the means for receiving from distinct locations within the geographic area are a function of and addressable by frequency.

15. The system of claim 10, wherein the beam forming network includes a plurality of signal-splitting devices connected to the input line thereof, a plurality of coupling means for interconnecting the input lines to the output lines, and a plurality of time-delay units associated with respective ones of the coupling means for producing a desired time delay to a signal applied thereto without introducing appreciable frequency dependent loss.

16. A satellite communication system comprising:
a forward link and a return link, the forward link being for relaying signals from a base station to mobile terminals and the return link being for relaying signals from the mobile terminals to the base station;
the forward link in the communication system comprising
a first antenna for receiving and transmitting signals at a first frequency range;
first diplexing means coupled to the first antenna for separating its transmit and receive paths;
a receive section coupled to the receive path, the receive section providing with
first means for filtering the signals received from the transmitting and receiving means, and
first means coupled to the first filtering means for converting the signals received therefrom to a second range of frequencies;
first beam forming network coupled to the signals from the first converting means;
first means coupled to the first beam forming network for amplifying the signals from the first network;
second diplexing means coupled to the first means for amplifying;
an array antenna coupled to the first means for amplifying via the second diplexing means for transmitting the signals a the second range of frequencies; and
the return link in the communication system comprising
a plurality of receivers coupled to the second diplexing means of the antenna array for receiving signals from the mobile terminals at the second range of frequencies;
a second beam forming network, responsive to signals from the plurality of receivers for providing signals at the second range of frequencies;
second means coupled to the second beam forming network for converting the signals received therefrom to the first range of frequencies;
a second filtering means for receiving the signals from the second converting means; and
means coupled to the second filtering means for providing signals to the first antenna at the first range of frequencies via the first diplexing means.

17. The communication system of claim 16 in which the first plurality of converting means further includes means for converting the first range of frequencies containing multiple sub-bands to a single L-band range by use of multiple local oscillator frequencies.

18. The communication system of claim 16 in which the second plurality of converting means includes means for converting the single L-band range into multiple first ranges by use of multiple local oscillator frequencies.

19. The communication system of claim 16 in which the first and second filtering means are pluralities of bandpass filters.

20. The communication system of claim 18 in which the first range of frequencies is a higher value than the second range of frequencies.

21. The communication system of claim 20 in which the first converting means comprises a plurality of down-converters and the second converting means comprises a plurality of up-converters.

22. In a satellite Communication system for receiving and transmitting signals within a geographic area and including a plurality of means for converting signals to be transmitted into the geographical area from a first range of frequencies to a second range of frequencies; and wherein each of the plurality of converting means having an output, a transmit beam forming network, the network comprising:
 a plurality of lines, each of the lines connected to a respective output of the plurality of converting means, and each of the lines being for containing a signal which is to be sent to one of a plurality of zones within the geographic area, with at least one of the lines including an alternating series of couplers and time-delay units; and
 a plurality of summers, each of the summers being coupled to at least two of the lines for accepting signals therefrom and for providing an output signal that is representative of signals accepted thereby.

23. The beam forming network of claim 22 in which each of the time delay units comprises;
 an all-pass filter that includes resonating means, and wherein
 each of the units delays each signal provided thereto to allow a beam scan angle associated with such signal to be appropriately related to the frequency of such signal.

24. In a satellite communication system for receiving and transmitting signals within a geographic area and including a plurality of means for receiving signals from the area, a receive beam forming network, the network comprising:
 a plurality of means for splitting signals received from the receiving means into a plurality of separate signals to be reconstructed as zone signals respectively associated with distinct zonal locations in the geographic area, each of the splitting means accepting a signal from a respective one of the receiving means; and
 a plurality of lines, each associated with a distinct zonal location for receiving the separate signals, each of the lines including an alternating series of couplers and time delay units, and wherein
 each of the signal splitting means delivers representative portions of the received signal provided thereto to one of the couplers of each of the lines of the network.

25. The beam forming network of claim 24 in which each of the time delay units comprises:
 an all-pass filter that includes resonating means, and wherein
 each of the units delays each signal provided thereto to allow a beam scan angle associated with such signal to be appropriately related to the frequency of such signal.

* * * * *